2 Sheets—Sheet 2.
J. H. BEAR.
Grain-Drill.
No. 60,826.
Patented Jan. 1, 1867.
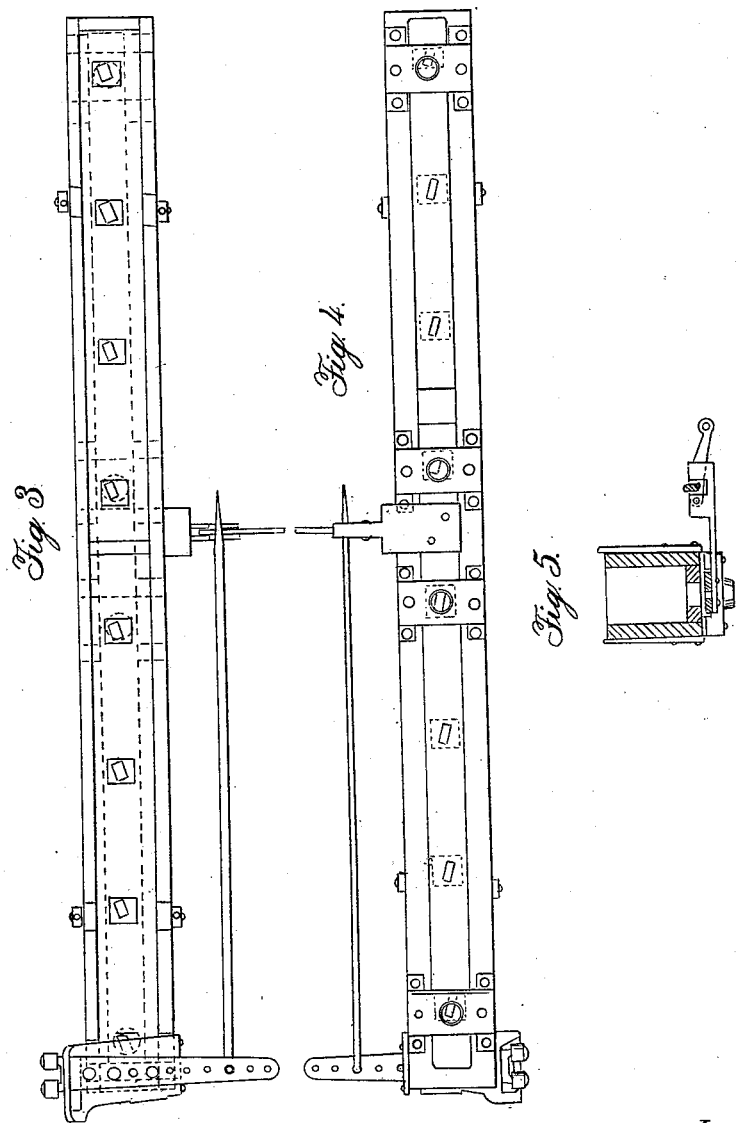

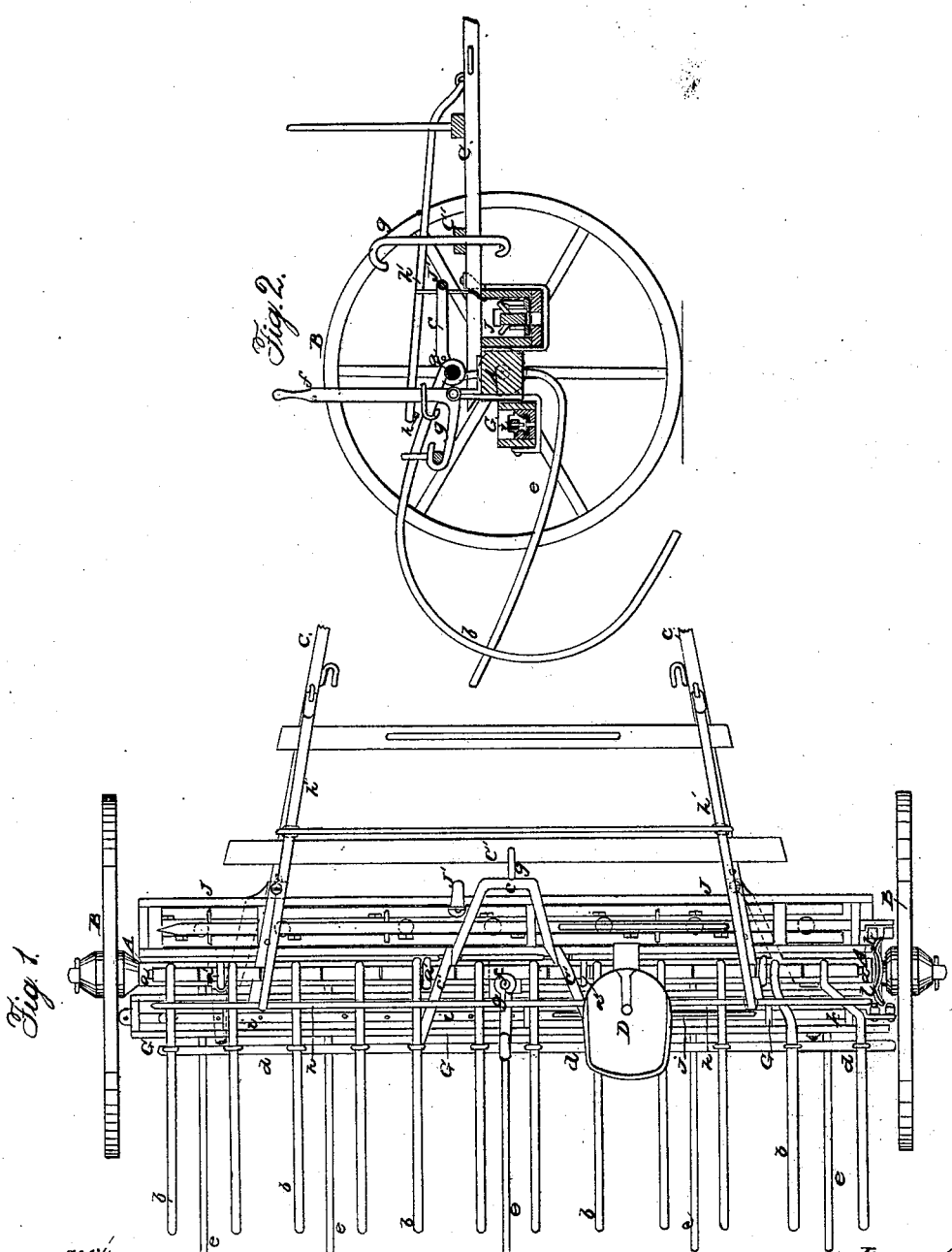

United States Patent Office.

JOHN H. BEAR, OF YORK, PENNSYLVANIA.

Letters Patent No. 60,826, dated January 1, 1867.

---

IMPROVEMENT IN HORSE HAY RAKE AND SEEDER COMBINED.

---

The Schedule referred to in these Letters Patent and making part of the same.

---

TO ALL WHOM IT MAY CONCERN:

Be it known that I, JOHN H. BEAR, of York, in the county of York, and State of Pennsylvania, have invented a Combined Hay Rake and Seeding Machine; and I do hereby declare that the following is a full, clear, and exact description thereof, reference being had to the accompanying drawings, making a part of this specification, in which—

Figure 1 is a top view of the combined machines.

Figure 2 is a vertical longitudinal section through the same.

Figure 3, sheet 2, is a top view of a seed hopper, which is adapted for use with the rakes.

Figure 4 is a side view of the hopper; and

Figure 5 is a cross-section through it.

Similar letters of reference indicate corresponding parts in the several figures.

The object of my invention is to combine a discharging hopper for guano, or for sowing seeds in rows or broadcast, with a horse hay rake, in such a manner that it shall be out of the way of the rake teeth in raising and lowering them, and be supported directly by the axle-tree, and in such relation to a driver's seat upon this axle-tree that the driver can raise and lower the rake teeth, and also adjust the seed-slide for regulating the dropping of seed, as will be hereinafter described.

To enable others skilled in the art to understand my invention, I will describe its construction and operation.

In the accompanying drawings A represents the axle-tree of two transporting-wheels; B B, and C C are the thills, which are secured directly to said axle-tree. D is the driver's seat, which is mounted upon the axle-tree, and $a$ is a transverse rod, which is also secured to the axle-tree by means of short eye studs, $a'$, arranged near the ends of said rod, $a$, and at intermediate points between them. To the rod, $a$, the rake teeth, $b$, are pivoted by means of tubular bearings, which are equal in length to the spaces between the teeth. A treadle, $c$, is used for elevating the rake teeth, which treadle is pivoted to the short arms, $c'$, that are secured across the rod, $a$, and that sustain a transverse lifting bar, $d$. To this bar, $d$, a number of staple guides are secured through which the rake teeth pass, and by which they are guided as they rise and fall independently of each other. The fork teeth, $e\ e$, are also secured to the axle-tree, A, and bent downward and backward, so as to clear the rake teeth of grass as they are elevated. Besides the treadle, $c$, a hand-lever, $f$, is applied for raising and lowering the rake teeth. Both the lever $f$ and the treadle $c$ are arranged in such relation to the driver's seat, D, that the driver can raise or lower the rake when required. To the foot-bar, C', which is in front of the axle A, a post, $g$, is erected having its upper end hooked, as shown in the drawings, and upon the hand-lever, $f$, a coupling-link, $g'$, is applied, which is designed for connecting with the post $g$ and keeping the rake teeth elevated when circumstances require. A bar, $h$, is applied to the rear ends of vibrating arms $h'\ h'$, and arranged over the rake teeth, for the purpose of enabling the driver to hold these teeth down to their work when considerable pressure is required for this purpose. In rear of the axle-tree A, and secured to strong stirrups projecting therefrom, I apply a broadcast guano distributor or seed hopper, G, the seed slide, $i$, of which is connected by a pitman, $j$, to a slide, $k$, which latter projects through the end of the hopper, G, and has two anti-friction rollers applied near its outer end, as shown in fig. 1. These small rollers receive between them a circular edge of a cam or corrugated wheel, $l$, which is secured upon the inside of the hub of the transporting-wheel B, as shown in fig. 1, sheet 1. This cam-wheel, $l$, communicates a reciprocating motion to the seed slide when the machine is moved along, and thus distributes the seed broadcast. In front of the axle, A, another seed hopper, J, is secured, the seed slide or feeder of which is also reciprocated by the cam-wheel $l$. This hopper is adapted for dropping grain in drills, and it is provided with an adjusting hand-lever, J', by which the driver, whilst sitting in his seat, D, can regulate the quantity of seed dropped. If desired, the seed hopper shown in figs. 3, 4, and 5, of sheet 2, may be used instead of the hoppers shown in figs. 1 and 2, or any other suitable hopper and seed-dropping or guano-distributing device may be employed, provided it is secured to the axle-tree by means substantially as described. I secure two very important advantages by securing the seed hopper directly to the axle-tree of the transporting-wheels of the rake, viz: I am enabled to so strengthen this axle that it can be made light without yielding or rendering it liable to break while raking up grass; the boxes act as strengtheners for this shaft, and stiffen it against the strain to which it is necessarily subjected when the rake teeth are pivoted to it, as I have described. I am also enabled to dispense with a frame which has hitherto been used when seed-hoppers were combined with hay rakes. By securing the seed hopper or hoppers to the axle-tree, A, I place them under the control of the driver, who is located upon a seat which is mounted upon said axle. In sowing timothy seed broadcast, the rake teeth may be held down by the driver for harrowing in this seed.

I do not claim attaching rake teeth to the rear extremity of the seed sower, as shown in the patent of Joshua Woodward, dated February 29, 1848; nor do I claim attaching hoppers to an axle *per se*, as in the patent of J. C. Gaston, on a seed sower, dated February 3, 1857; nor do I claim a hay rake *per se*, as constructed in the patent of A. B. Sprout, dated June 6, 1865, and reissued January 16, 1866; but

Having thus described my invention, what I claim as new, and desire to secure by Letters Patent, is—

1. Securing one or more seed hoppers, which are provided with seed-dropping devices or guano distributors, to the axle-tree of a hay rake, the teeth and driver's seat of which are applied to said axle, substantially as described.

2. The combination of the hopper box G, axle-tree A, driver's seat D, and a lever for enabling the driver to hold the rake teeth down for harrowing in the seed, substantially as described.

JOHN H. BEAR.

Witnesses:
   GEORGE M. SHELLER,
   GEORGE LAW.